(12) United States Patent
Ikku

(10) Patent No.: US 7,054,506 B2
(45) Date of Patent: May 30, 2006

(54) PATTERN MEASURING METHOD AND MEASURING SYSTEM USING DISPLAY MICROSCOPE IMAGE

(75) Inventor: Yutaka Ikku, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 757 days.

(21) Appl. No.: 10/147,419

(22) Filed: May 16, 2002

(65) Prior Publication Data

US 2002/0181776 A1    Dec. 5, 2002

(30) Foreign Application Priority Data

May 29, 2001    (JP) ............................. 2001-160756

(51) Int. Cl.
*G06K 9/36*    (2006.01)

(52) U.S. Cl. ...................... 382/286; 382/282; 382/284; 358/504; 358/520

(58) Field of Classification Search ................ 382/266, 382/274, 282, 248; 358/3.27, 504, 520
See application file for complete search history.

(56) References Cited

U.S. PATENT DOCUMENTS

| | | | | |
|---|---|---|---|---|
| 6,069,733 A | * | 5/2000 | Spink et al. ................ | 359/388 |
| 6,072,624 A | * | 6/2000 | Dixon et al. ................ | 359/385 |
| 6,483,948 B1 | * | 11/2002 | Spink et al. ................ | 382/255 |
| 6,555,816 B1 | * | 4/2003 | Sawahata et al. ........... | 250/310 |
| 6,674,884 B1 | * | 1/2004 | Bacus et al. ................ | 382/133 |

* cited by examiner

*Primary Examiner*—Bhavesh M. Mehta
*Assistant Examiner*—Yosef Kassan
(74) *Attorney, Agent, or Firm*—Adams & Wilks

(57) ABSTRACT

A method of measuring a pattern by using a display microscope image comprises a step of setting an edge detection reference line by designating a range of detecting an edge and a number of edge points with regard to a respective side portion of the pattern in the microscope image, a step of sampling the edge point constituting a point of changing a brightness from image information by searching the edge point from a direction orthogonal to the set edge detection reference line, a step of providing a line approximating the respective side portion of the pattern based on position information of a plurality of the edge points and a step of specifying a shape of the pattern by an intersecting point of two pieces of lines, a specified point provided by a plurality of intersecting points, an angle made by two pieces of straight lines and a distance between two specified points from information of the approximated line approximating the respective side portion of the pattern.

7 Claims, 5 Drawing Sheets

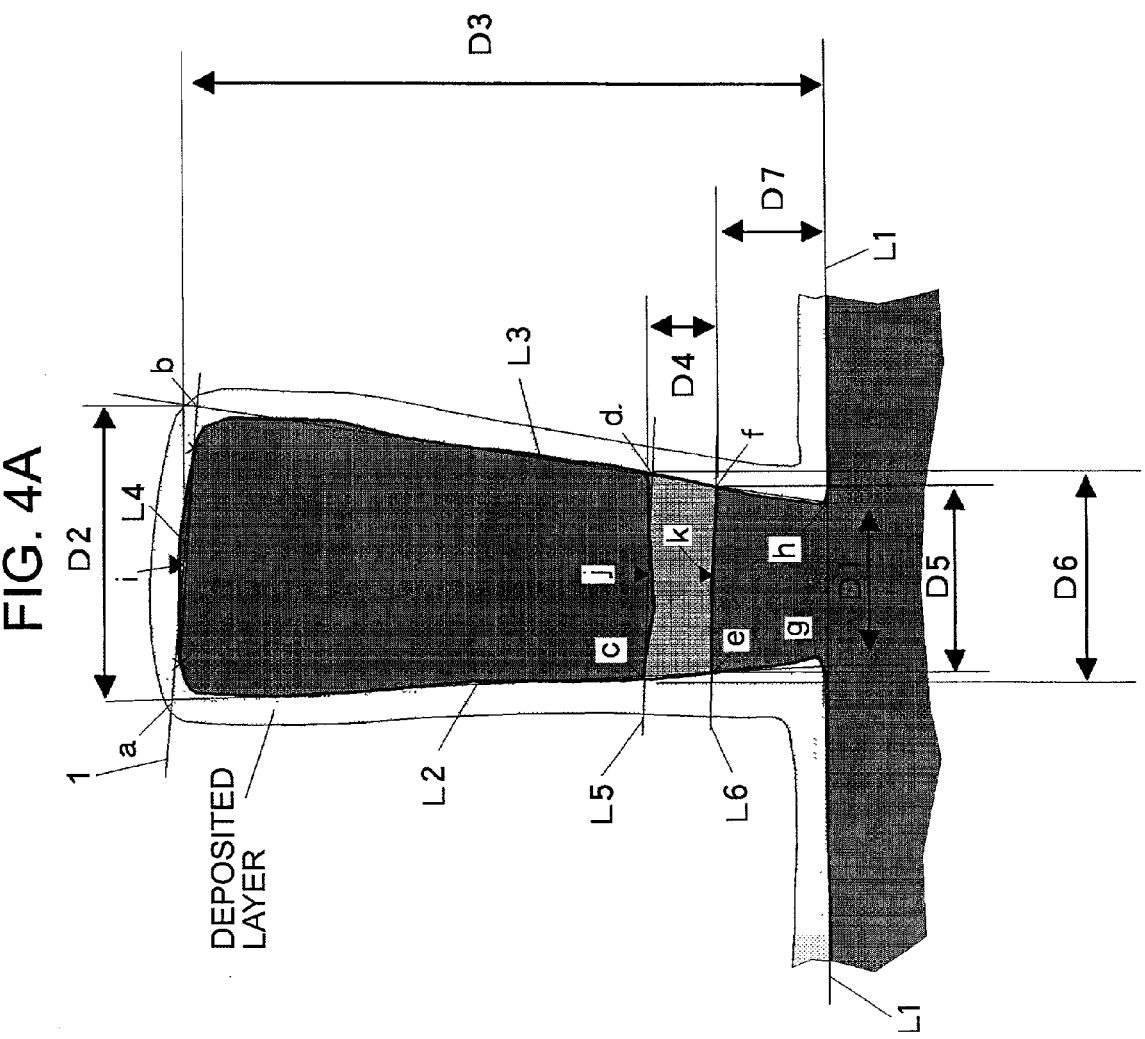

PATTERN MEASURING METHOD AND MEASURING SYSTEM USING DISPLAY MICROSCOPE IMAGE

BACKGROUND OF THE INVENTION

The present invention relates to a pattern measuring method by using image information of microscope image displayed on a display as in a scanning ion microscope or a scanning electron microscope and a system executing the method.

Measurement of a pattern length using a scanning microscope such as a scanning ion microscope or a scanning electron microscope, can be dealt with as screen coordinate information in an microscope image having a high magnification and therefore, in measuring a distance between two points, in principle, the distance can be detected by accuracy of image resolution. Conventionally, there has widely been carried out length measurement of a submicron order as in a semiconductor pattern by using the technology. According to the method, for example, in measuring a length of a pattern as shown by FIG. 5A, an area is set in an observation image of the microscope by drawing two pieces of cursor lines 40a and 40b in the horizontal direction, brightness information along a plurality of pieces of scanning lines in the area, is summed up in the vertical direction to thereby provide a line profile signal 32 as shown by FIG. 5B to thereby detect edges thereof and measure a distance between the edges. It is general that the edges are detected by calculating positions of maximum inclination of the line profile signal 32, that is, calculating a differentiated signal 33 of the line profile signal 32 and determining the edges by a maximum value and a minimum value thereof as shown in FIG. 5C. Although the method can execute proper measurement when a pattern is constituted by a constant width as in the example, the method is not applicable when the pattern is of an indefinite complicated shape or an angle made by two pieces of nonparallel straight lines or dimensions of an upper side and a bottom side of a trapezoidal shape, is intended to provide.

Conventionally, in measuring a length of a pattern formed by nonparallel lines, there is adopted a method of calculating a distance between two points from screen coordinates by previously determining a portion between two points to be measured such as a width dimension of a front end, a width dimension of a base portion, or a dimension in a longitudinal direction of a pattern from an image of the pattern and plotting to specify corresponding points on an observation image by an operator. According to the method, the distance between the plotted two points can finely be measured in an image resolution order. However, the corresponding points are specified based on pattern recognition of an operator, further, plotting is carried out by manual operation and therefore, even when the length is measured with regard to the same sample, the acquired data is accompanied by a dispersion by individual difference and in respective measurement. For example, when a width of a front end of a pattern formed on a semiconductor device, is measured, corner portions of the pattern are generally formed to be rounded when viewed on an observation image in a procedure of forming the pattern by lithography and therefore, there is not an absolute reference in to which locations positions of both ends of the front end width portion are to be specified. Therefore, specification of the corresponding points is entrusted to the selection based on the determination of the operator at respective time. This causes the dispersion.

It is a problem of the invention to provide a measuring method having high objectivity and reproducibility, which can measure a shape of an arbitrary pattern surrounded by nonparallel lines in measuring the pattern using display image information as a scanning microscope and in which individual difference or an error for respective measurement is difficult to be brought about, further, to provide a system realizing the measuring method.

SUMMARY OF THE INVENTION

A method of measuring a length according to the invention is a method of measuring a pattern by using a display microscope image comprising a step of setting an edge detection reference line by designating a range of detecting an edge and a number of edge points to a respective side portion of the pattern in the microscope image, a step of sampling the edge point constituting a point of changing a brightness from information of the image by searching the edge point from a direction orthogonal to the set edge detection reference line, a step of providing a line approximating the respective side portion of the pattern based on position information of a plurality of the edge points and a step of specifying a shape of the pattern by an intersecting point of two pieces of lines, a specified point provided from a plurality of intersecting points, an angle made by two pieces of straight lines and a distance between two specified points from information of the approximated line approximating the respective side portion of the pattern.

According to an aspect of the invention, the means for sampling the edge point from the information of the image samples the edge point by summing up a plurality of brightness profile signals disposed forwardly and rearwardly in a direction of the edge detection reference line.

According to another aspect of the invention, in detecting the point of changing the brightness, in order to make detection of a boundary of the pattern steady, there is provided a function capable of setting a direction of searching the point of changing the brightness, a direction of changing the brightness and at what number of an order the point of changing the brightness is disposed. Further, with regard to a pattern of a section, a substance having a brightness different from that of the pattern is previously coated on the pattern of the section by deposition by using an focused ion beam apparatus.

Further, a mode of synthesizing the line approximating the respective portion of the pattern, is an intersecting point of two pieces of lines, a specified point provided from a plurality of interchanging points, an angle made by two pieces of straight lines, or a distance between two specified points. Further, in order to calculate information of an angle of intersecting two pieces of lines approximating the side portion of the pattern and a position of an intersecting point of the two pieces of lines, there is provided a function of executing the calculation by specifying two pieces of lines and thereafter simply designating the angle or the intersecting point.

BRIEF DESCRIPTION OF THE DRAWINGS

FIGS. 4A, 4B are views showing an example of executing measurement of shape according to the invention by taking a sample of a section of a magnetic head.

DESCRIPTION OF THE REFERENCE NUMERALS AND SIGNS

Figure 1A:
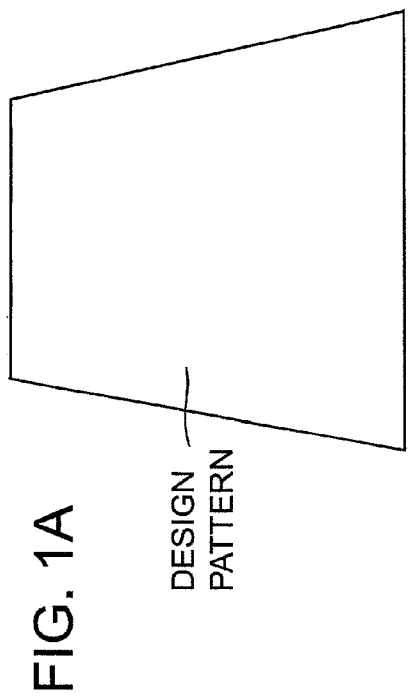
FIGS. 1A–1D illustrate views for explaining a method of measuring a shape according to the invention by taking an example of a trapezoidal pattern.

1 Edge detection reference line
2 Edge point
32 Brightness profile
33 Differentiated profile
D1, D2, . . . , D7 Dimensions
a, b, c, d Sides of pattern
L1, L2, . . . , L6 Approximated lines of sides
a, b, . . . , h Intersecting points of approximated lines
α, β, γ Angles of intersecting approximated lines

DETAILED DESCRIPTION OF THE INVENTION

It is an object and a problem of the invention to provide a measuring method capable of measuring a shape of an arbitrary pattern surrounded by nonparallel lines in measuring a pattern by using a scanning microscope and preventing individual difference or an error in respective measurement from being brought about. For example, in measuring a dimension of an upper side of a trapezoidal pattern surrounded by nonparallel straight lines, the dimension cannot be provided with the dimension by detecting positions of edges of the pattern from a brightness profile signal of a scanning line as in the conventional system. Therefore, when the length is going to be measured by the conventional system, an operator specifies the both end portions of the upper side of the trapezoidal pattern on an observation image and calculates the distance between two points by a calculation from image coordinate information. The value may be regarded as accurate data as a value of measuring the length of the distance between two points. However, the end portions of the upper side cannot clearly be specified in the pattern on the image. Particularly, when the pattern is a pattern of a semiconductor, a corner portion thereof is formed to be rounded by any means and therefore, the specification is accompanied by individual difference and an error for respective measurement of the operator. Further, the upper side is not necessarily finished in a relationship in parallel with the bottom side as designed. There also poses a problem that when the upper side is not in parallel with the bottom side, the dimension between the two ends is not necessarily pertinent as data of a width of the upper side for evaluating the pattern.

Hence, according to the invention, there is provided a conception in which in measuring the shape of the pattern, the emphasis is not given to the position of the corner portion which is difficult to specify but the emphasis is given to line information of the side forming the pattern and the shape of the pattern based thereon is grasped and evaluated. Further, as a method of detecting the line information of the side forming the pattern, there are carried out a step of setting an edge detection reference line at an area representing the side with regard to the side of the pattern in the microscope image, a step of designating a number of edge points to be sampled along the set edge detection reference line and sampling the edge points from image information constituting points of changing a brightness by searching the edge points from a direction orthogonal to the edge detection reference line, and a step of providing a line approximating the respective side portion of the pattern based on position information of a plurality of the edge points. The side of the pattern is not necessarily directed in the horizontal or vertical direction in the microscope image but can be directed in any direction generally. The edge is detected by using not a brightness profile signal provided in accordance with scanning of beam but a brightness profile signal provided by reading the image in a designated arbitrary direction from the image information which has already been stored in an image memory as an observed image. Further, according to the invention, there is provided a pattern measuring method using a display microscope image further carrying out a step of providing a line approximating the respective side of the pattern based on position information of the plurality of edge points constituting the points of changing the brightness in this way and specifying and measuring the shape of the pattern by synthesizing the line approximating the respective side forming the pattern.

Figure 1B:
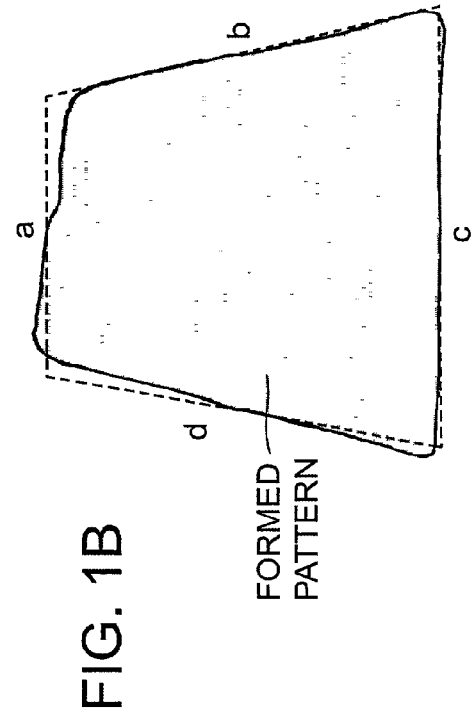
Figure 1C:
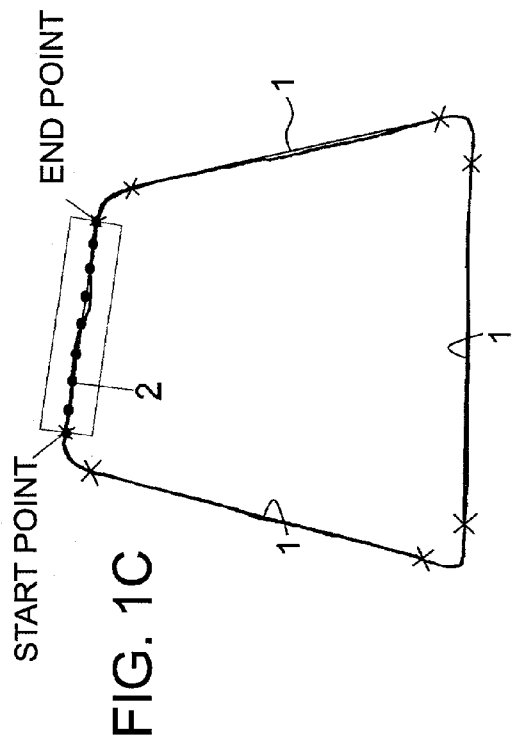
Figure 1D:
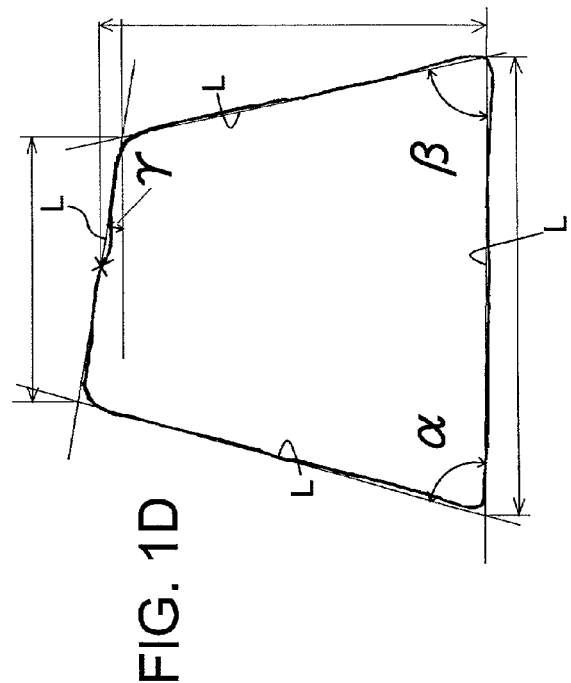

Now, assume that an observed pattern is a trapezoidal pattern as shown by FIGS. 1A, 1B, 1C and 1D. FIG. 1A shows a design pattern and what is indicated by broken lines in FIG. 1B is the design pattern and what is indicated by bold lines is an actually formed pattern. Now, with regard to four sides a, b, c and d forming the trapezoidal pattern in the observation image, as shown by FIG. 1C, an area which is regarded to represent the respective corresponding side is specified by plotting a start point and an end portion thereof to thereby set an edge detection reference line. For example, with regard to the upper side a, the operation is executed by inputting a position by using a mouse or the like to thereby designate a range of providing an edge point information. At this occasion, there is designated a number of how many edge points of information is provided in the corresponding edge detection reference line segment 1 (the number can also be expressed by an edge point interval) and there is set a length of search line to necessarily include a direction of searching a change in brightness and points of changing the brightness in the area in a search range. By outputting a brightness profile signal from the image information, the point of changing the brightness is detected as an edge position of the pattern. The sampling of edge point is not determined only by a detected value provided by searching a line including an edge point 2. There are also searched changes at vicinities of the edge point 2 on both sides thereof in the edge detection reference line 1, profile signals thereof are summed up and sampled as edge point information representing the vicinities. Now, when the pattern portion is brought into a mode displayed darkly relative to a substrate portion, a point at which the brightness is abruptly reduced in search from the substrate side to the pattern side, is determined as the edge. The determination is detected by differentiating the profile signal or by a position at which the profile signal intersects with a brightness threshold line as the point of changing the brightness. With regard to other edge point, the point of changing the brightness is similarly detected and the position information is stored. The edge position information is provided by the number of the edge points 2 and therefore, based on the position information, there is calculated an approximated line L matching therewith as a whole and the approximated line information is stored. The side a in this case is the upper side of the trapezoidal shape in design and therefore, the approximated line becomes straight line information. Similar operation is carried out with regard to other three sides and an area surrounded by the four approximated straight lines corresponds to the pattern area. As shown by FIG. 1D, the trapezoidal pattern information provided as information of the four approximated straight lines, is calculated and stored in the form of data pertinent for grasping and evaluating the shape with regard to the formed pattern, for example, a dimension of the bottom side, angles of both sides and the upper side relative to the bottom side, a distance between the upper side and the bottom side, a dimension of the upper side and the like. At this occasion, the dimension of the bottom side is not measured from a pattern having rounded corner portions but is provided by calculating intersecting points of the approximated straight line of the bottom side and the approximated straight lines of the both sides by a calculation and calculating a distance between the two points from coordinate information of the two points. Angles α and β of the both sides and the upper side relative to the bottom side are calculated from the approximated straight line of the bottom side and the approximated straight lines of the both sides by a calculation. Further, the approximated straight line of the upper side and the approximated straight line of the bottom side are not necessarily brought into a parallel relationship as designed and therefore, an angle γ of the upper side relative to the bottom side is calculated from the respective approximated straight lines by a calculation. When an equation approximating the upper side and an equation approximating the bottom side are nonparallel, the distance between the upper side and the bottom side is not uniquely determined and therefore, a line orthogonal to the bottom side approximating line is extended downwardly from a middle point of the upper side and the distance between the upper side and the bottom side is defined as a distance from the middle point to a point intersecting with the bottom side approximating straight line. The dimension of the upper side can also be provided similar to the dimension of the bottom side by calculating intersecting points of the approximated straight line of the upper side and the approximated straight lines of the both sides by a calculation and by calculating the distance between the two points from coordinate information of the two points. However, there is a case in which when the upper side and the bottom side are nonparallel, the distance is not necessarily pertinent as the dimension of the upper side evaluating the trapezoidal shape. Hence, for example, by erecting lines respectively orthogonal to the bottom face from the two points and the dimension of the upper side is defined by a distance between the two lines. The distance corresponds to a distance between the two points in view from a direction in parallel with the bottom side. Further, the above-described definition of the points for measuring the length to be measured is only an example and the points for measuring the length needs not to be defined always in this way. In sum, there may be constituted a definition pertinent for grasping and evaluating the shape of the respective formed pattern. Thereby, there is provided a technical significance as a measuring method in that the distance between the corner portions of the shape of the pattern having the rounded corner portions can be measured and there can be acquired data having objectivity and stability of preventing the individual difference and the error for respective measurement from being brought about.

Figure 2:
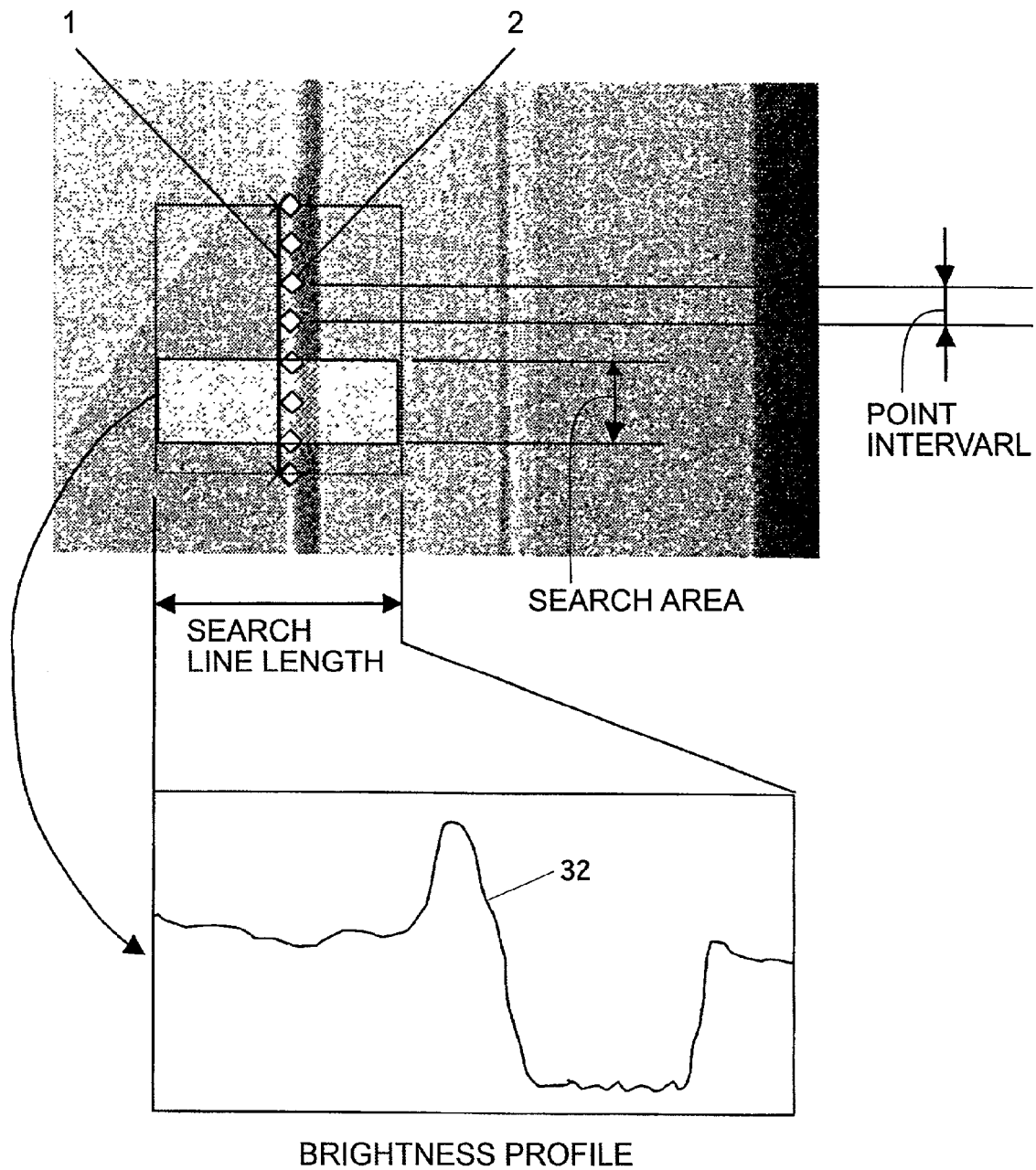
FIG. 2 is a view for explaining a method of sampling edge point information according to the invention.
Figure 3:
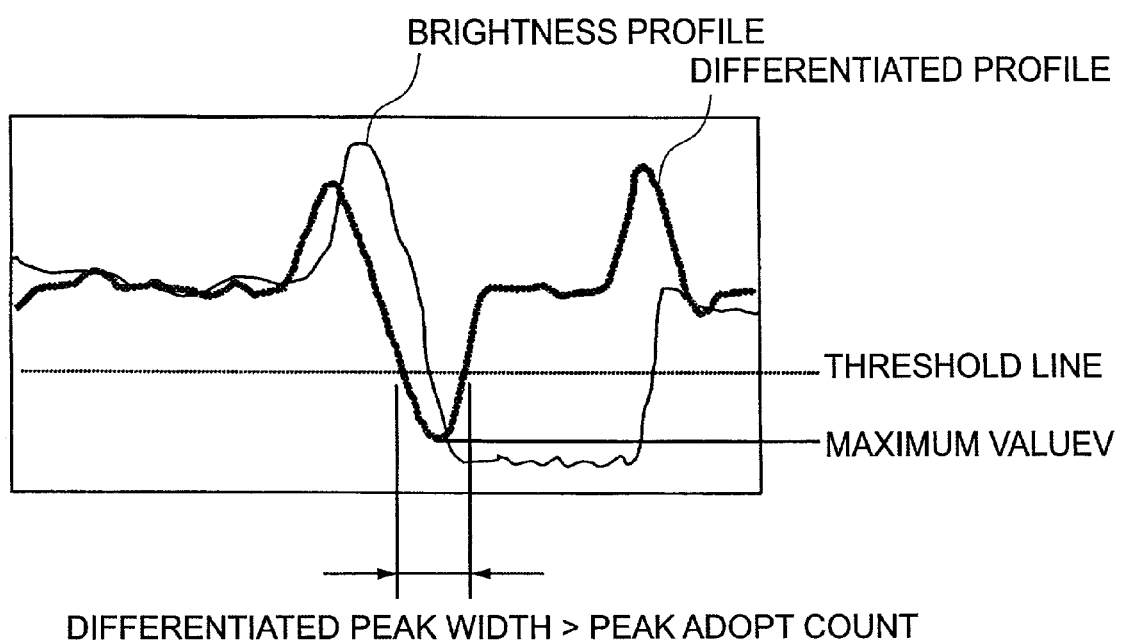
FIG. 3 is a diagram for explaining a method of calculating an edge point constituting a maximum brightness changing point from a brightness profile signal.
Figure 5B:
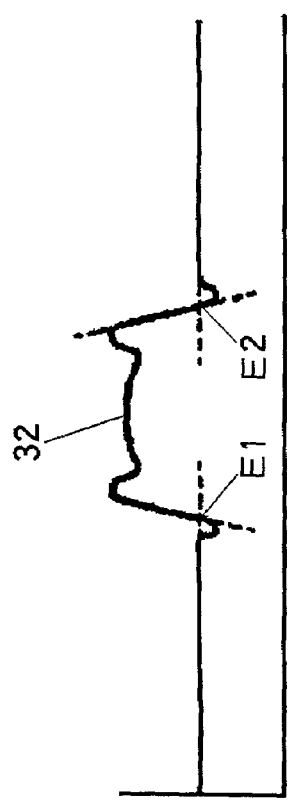
FIGS. 5A–5C are diagrams for explaining a conventional technology of measuring a length of a pattern.
Figure 5C:
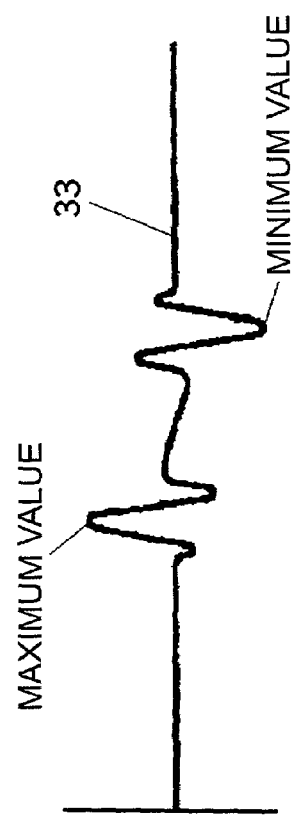
Figure 5A:
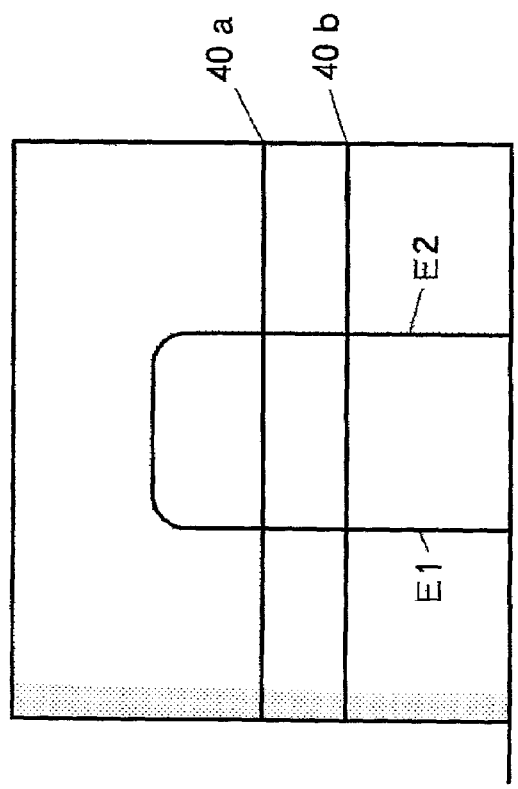

According to the invention, detection of the edges of the pattern constitutes basic data and is provided with an important significance. Hence, a detailed explanation will be given of detection of the edge in reference to FIG. 2. There is provided boundary information of a pattern formed in a microscope image shown at an upper stage of FIG. 2. The edge detection reference line 1 is set by designating a start point and an end point designated by x marks. Successively, when a number of the edge points 2 is designated, an interval between the start point and the end point is uniformly divided by the number minus 1. The number may be designated by a point interval. Further, there is set a length of a search line for searching a change in brightness, the search line becomes a straight line orthogonal to the edge detection reference line 1 and a length thereof is set to necessarily include edges of a pattern in an area of the set edge detection reference line 1. In the drawing, a rectangular area centering on the edge detection reference line 1, constitutes an area of searching the brightness profile. Now, here, for simplicity, the edge reference line 1 is directed in the vertical direction, however, the direction takes any direction generally. Further, in this example, with regard to the position information of the edge point 2, all of edge information of an area between the both sides of the edge point displayed by white is searched and the provided brightness profile is summed up and synthesized. When there is provided a summed up brightness profile 32 as shown by a graph at a lower stage of FIG. 2, from the information, a position having the steepest change of the brightness is calculated and sampled as edge point information representing the area. The profile signal is not provided by scanning by the microscope but read from the image information stored in the image memory and therefore, the search direction is not needed to be horizontal as in the example but any direction can be dealt with. As shown by FIG. 3, the position having the steepest change of the brightness can be provided as a peak value of a differentiated profile signal 33 produced by differentiating the brightness profile. In this example, the pattern edge is a portion which is darkened after having been brightened temporarily and therefore, the pattern edge is disposed at a position of taking a minimum value of the differentiated profile signal. Further, when the pattern is an image which is brightened relative to the surrounding, conversely, the pattern edge takes a maximum value. As has been explained above, according to the invention, the position information of the edge point is not a value actually detecting the pattern edge of the corresponding position but is constituted by synthesizing edge information of the surrounding.

Now, there is a sample in which a stripe pattern or a granular pattern referred to as grain pattern is observed in a microscope image. It is not necessarily easy to provide a boundary line at which a material in the grain pattern area of such a sample is changed as a point of changing brightness. Hence, according to the invention, it has been conceived to provide a function of selecting a search direction when the edge detection reference line is designated. That is, when a change in brightness is searched from the grain pattern area in a direction of a pattern area of a foreign material, the brightness is frequently changed in the grain pattern area and the change in the brightness may be confused as the edge signal of the pattern intended to detect and there is a danger of executing erroneous detection. Hence, according to the invention, the search direction is made to be able to select from the side of the pattern area of the foreign material constituting an area of stabilizing the brightness to the grain pattern area. By the function, an initial point of changing the brightness constitutes the edge signal of the pattern intended to detect and therefore, stable detection without erroneous recognition is enabled.

Further, there also is the case in which other pattern is present on an outer side of a pattern and an aimed pattern is present in the other pattern. In such a case, when search of the brightness signal along the edge detection reference line according to the invention is executed, a plurality of brightness change points are passed and there poses a problem of by which brightness change point is to be determined as the edge of the aimed pattern. Hence, according to the invention, in designating the edge detection reference line which is carried out by observing the microscope image, there is provided a function capable of specifying at which number of an order of the brightness change points the edge of the aimed pattern is disposed while monitoring the microscope image. Thereby, the edge of the pattern of the aimed image can properly be detected without erroneous recognition.

Further, in the case in which a sample is a section of a projected portion, when the microscope image of the section is observed, an outer side of the aimed section pattern constitutes a space and information of the background portion is detected as image information and in such a case, there is a case in which a boundary portion by the brightness signal is difficult to detect. Hence, according to the invention, there is adopted a method of carrying out a pretreatment in which a substance easy to identify as a brightness signal from a material of the section portion, is covered to a surface of the projected portion by deposition by using a focused ion beam apparatus for machining the section. A foreign matter having different brightness is present on an outer side of a boundary of the section of the projected portion of the sample by the deposition and accordingly, when the brightness signal is searched along the edge detection reference line, a clear change in the brightness signal can be detected at the boundary portion. Further, when the search direction is determined from the deposited material and the material of the pattern, it is previously known whether the change in the brightness is an uprising change or a lowering change and therefore, the edge can be detected further firmly by designating the change direction. The invention is carried out based on the image information of the microscope having high magnification displayed on the display and therefore, the invention is not limited to the scanning ion microscope or scanning electron microscope but is applicable to a probe microscope or to an optical microscope having high magnification of an image in a dark field of vision using laser beam providing the image information of high magnification microscope.

EXAMPLE 1

There is shown an example of measuring a sectional shape of a magnetic head (for writing) as shown by FIGS. 4A and 4B by using a pattern measuring system according to the invention, in this example, a focused ion beam apparatus. In the drawing, FIG. 4A shows a microscope image and FIG. 4B is a design image thereof.

Step 1: Focused ion beam is firstly irradiated to a surface of a magnetic head portion intended to observe while blowing phenanthrene to thereby form a coating of carbon by deposition. A material of the head portion is constituted by permalloy and therefore, it is important in this case to select a deposition material making a contrast in brightness therewith.

Step 2: Ion current is irradiated to increase, the magnetic head portion is subjected to sputter etching in a roughly machined mode and when the sectional portion is machined and exposed, the ion current is reduced and a surface of the section is finished.

Step 3: The sample is positioned to tilt in a direction capable of observing the formed section and an image of the section of the magnetic head disposed as a smooth plane is taken by the function of the scanning ion microscope and stored to an image memory.

Step 4: The design shape (FIG. 4B) of a pattern attracting attention has already been known by CAD information or the like and therefore, selection of length measuring points suitable for grasping and evaluating the shape of the sample, is generally determined beforehand and therefore, the corresponding points are confirmed while observing the microscope image on a display or newly selected independently therefrom depending on cases. In the case of the magnetic head, according to the sectional shape in design, as shown by FIG. 4B, there is formed the head portion having a trapezoidal shape in which long sides are provided at a base portion and an upper side is slightly longer than the bottom side and a write gap is formed in parallel with the bottom face at a vicinity of the base portion of the head portion. Therefore, approximated lines necessary for being sampled for grasping the shape of the magnetic head are constituted by 6 pieces of straight lines of a line L1 at the surface of the base, two sides L2 and L3 of the magnetic head, an upper side L4 of the magnetic head and two end sides L5 and L6 of the write gap constituting opposed magnetic poles. Further, the shape of the magnetic head is grasped by providing the 6 pieces of approximated lines. Next, length measuring points suitable for evaluating the shape are selected. In this case, dimensions to be calculated are constituted by 7 kinds of a dimension D1 (corresponding to the bottom side of the trapezoidal shape), a dimension D2 of a front end portion of the head (corresponding to the upper side of the trapezoidal shape), a longitudinal dimension D3 of the head portion, a dimension D4 of an interval of the write gap, a dimension D5 of a lower side of the gap, a dimension D6 of an upper side of the gap and a distance D7 between the lower side of the gap and the surface of the base. The respective dimensions are defined as follows.

Dimension D1 of the base portion of the head: A distance between an intersecting point g of the approximated lines L1 and L2 and an intersecting point h of the approximated lines L1 and L3.

Dimension D2 of the front end portion of the head: There is drawn an auxiliary line passing through an intersecting point a of the approximated lines L4 and L2 and orthogonal to the approximated line L1, successively, there is drawn an auxiliary line passing through an intersecting point b of the approximated lines L4 and L3 and orthogonal to the approximated line L1, then, the distance is defined by a distance between the two auxiliary lines in parallel with each other.

Dimension D3 in the longitudinal direction of the head portion: A length of a line drawn downwardly and orthogonally to the approximated line L1 from a middle point i between the intersecting point a of the approximated lines L4 and L2 and the intersecting point b of the approximated lines L4 and L3.

Dimension D4 of an interval of the write gap: a length of a line drawn downwardly and orthgonally to the approximated line L6 from a middle point j of the intersecting point c of the approximated lines L5 and L2 and an intersecting point D of the approximated lines L5 and L3.

Dimension D5 of the lower side of the gap: There is drawn an auxiliary line passing through an intersecting point e of the approximated lines L6 and L2 and orthogonally to the approximated line L1, successively, there is drawn an auxiliary line passing through an intersecting point f of the approximated lines L6 and L3 and orthogonally to the approximated line L1, then, the dimension is defined by a distance between the two auxiliary lines in parallel with each other.

Dimension D6 of the upper side of the gap: There is drawn an auxiliary line passing through the intersecting point c of the approximated lines L5 and L2 and orthogonal to the approximated line L1, successively, there is drawn an auxiliary line passing through the intersecting point D of the approximated lines L5 and L3 and orthogonal to the approximated line L1, then, the distance is defined by a distance between the auxiliary lines in parallel with each other.

Distance D7 between the lower side of the gap and the surface of the face: A length of a line drawn downwardly and orthogonally to the approximated line L1 from a middle point k between the intersecting point e of the approximated lines L6 and L2 and the intersecting point f of the approximated lines L6 and L3.

Further, the above-described definition is based on a judgment that it is pertinent to evaluate the shape of the magnetic head based on the surface of the base. In this case, when the approximated straight line L1 is provided, and when a coordinate system of a screen is adjusted such that the approximated straight line L1 becomes in parallel with the abscissa of the screen, the following calculation of coordinates is carried out by a simple difference calculation of only a vertical coordinate and a horizontal coordinate.

Step 5: Next, there is sampled 6 pieces of the approximated lines necessary for grasping the shape. In order to sample the upper side approximated line L4, while monitoring a microscope image, there are specified two points of a line area which is recognized to represent the side as shown by x marks in the drawing by a mouse and there is selected the edge detecting reference line 1 in correspondence with the operational area. Further, there are designated a number of the edge points 2, which is recognized to be necessary and a search direction from inside of the area. In this case, an outer side of the head is formed with a deposited layer which is stable in view of brightness and therefore, there is designated to search the point of changing the brightness signal from the outer side to the head portion. When the designated number of edge point information is provided from the differentiated value of the brightness profile signal, there is provided an approximated straight line synthesizing these points. In providing the approximated straight line, there can be applied a general program for plotting a plurality of acquired data on graph coordinates and displaying the approximated line synthesizing these by a graph. The approximated line information is stored as a function on the coordinates of the screen. In the following, the approximated lines L2, L3, L5 and L6 are sampled by a similar method and the information is stored. The approximated line L1 is divided to the left and to the right by the base portion of the head and therefore, the edge detection reference line is selected by specifying line areas recognized to respectively represents the left and the right lines by a mouse. Further, it is similar to the case of other side that there is designated a number of the edge points which are recognized to be necessary from inside of the area. According to the approximated line of L1, it is different from sampling other approximated line in that a single piece of the approximated straight line L1 is sampled by synthesizing all of points of changing the brightness signals provided with regard to the two left and right edge detection reference lines.

Step 6: From data of 6 pieces of the provided approximated straight lines, necessary screen coordinate information of the intersecting points a through h and necessary screen coordinate information of the middle points i through k are provided and stored to the memory. The system of the embodiment is provided with a function of executing to calculate intersected point position information at the coordinates of the screen when two pieces of lines are specified in an intersecting point calculation mode. Further, although not used in the embodiment, there is also provided a function in which when two pieces of straight lines are specified in a state of setting an angle calculation mode, an angle by which the two lines intersect with each other is calculated. Successively, two points are specified, a middle point calculation is designated and position information of the middle points i, j and k is provided and stored to the memory.

Step 7: There is executed to measure seven kinds of lengths suitable for evaluating the shape. First, the dimension D1 of the base portion is calculated from a distance between the intersecting point g and the intersecting point h, the dimension D2 of the front end portion of the head is calculated as follows, the auxiliary line passing through the intersecting point a and orthogonal to the approximated line L1 is drawn, successively, the auxiliary line passing through the intersecting point b and orthogonal to the approximated line L1 is drawn and the dimension D2 is calculated from the distance between the two auxiliary lines in parallel with each other, the dimension D5 of the lower side of the gap is calculated as follows, the auxiliary line passing through the intersecting point e and orthogonal to the approximated line L1 is drawn, successively, the auxiliary line passing through the intersecting point f of the approximated lines L6 and L3 and orthogonal to the approximated line L1 is drawn and the dimension D5 is calculated from the distance between the two auxiliary lines in parallel with each other, the dimension D6 of the upper side of the gap is calculated as follows, the auxiliary ling passing through the intersecting point c and orthogonal to the approximated line L1 is drawn, successively, the auxiliary line passing through the intersecting point d and orthogonal to the approximated line L1 is drawn and the dimension D6 is calculated from the distance between the two auxiliary lines in parallel with each other, however, when L1 which is the line approximating the surface of the base is adjusted to be in parallel with the abscissa of the screen, it is not necessary to take the auxiliary lines into consideration and the dimensions are simply provided by calculating the differences between the horizontal coordinates of the respective two intersecting points. Further, the dimension D3 in the longitudinal direction of the head portion is calculated from the length of the line drawn downwardly and orthogonally to the approximated line L1 from the middle point i between the intersecting point a and intersecting point b, the dimension D4 of the interval of the write gap is calculated from the length of the line drawn downwardly and orthogonally to the approximated line L6 from the middle point j between the intersecting point c and the intersecting point d, the distance D7 between the lower side of the gap and the surface of the base is calculated from the length of the line drawn downwardly and orthogonally to the approximated line L1 from the middle point k between the intersecting point e and the intersecting point f, however, when the approximated line L1 is adjusted to be in parallel with the abscissa of the screen, the dimensions can simply be provided by calculating differences in the vertical coordinates of the middle points and the approximated straight line L1 with no necessity of taking the vertical lines into consideration.

According to the invention, there is provided a method of measuring a pattern by using a display microscope image comprising a step of setting an edge detection reference line by designating a range of detecting an edge and a number of edge points with regard to a respective side portion of the pattern in the microscope image, a step of sampling the edge point constituting a point of changing a brightness from image information by searching the edge point from a direction orthogonal to the set edge detection reference line, a step of providing a line approximating the respective edge portion of the pattern based on position information of a plurality of the edge points and a step of specifying a shape of the pattern by synthesizing information of the approximated line of the respective side portion of the pattern. That is, according to the method of measuring a pattern using a display microscope image of the invention, the basis of the method is not constituted by indefinite position information in grasping a shape such as a corner portion of the pattern but the basis is constituted by information of the approximated line of the edge of the side and therefore, there can be provided a measuring method capable of measuring a shape of an arbitrary pattern surrounded by nonparallel lines and hardly causing individual difference or an error for respective measurement.

Further, according to a mode of synthesizing information of a line approximating the respective side portion of the pattern of the invention, an intersecting point of two pieces of lines, a specific point provided by a plurality of intersecting points, an angle made by two pieces of straight lines, a distance between two specified points or the like is provided by the calculation constituting the basis by the information of the line, according to the calculation, there is provided a function of executing the calculation by specifying two pieces of lines and thereafter simply designating an angle or an intersecting point and therefore, by simple operation, there can be provided information of a desired shape capable of grasping and evaluating the shape.

According to the invention, there is adopted a method of coating a substance facilitating to identify the brightness on a surface of a sample previously by deposition using an ion beam apparatus and therefore, even in the case of a sample constituting a surrounding of the pattern by a space, the edge of the pattern can easily and firmly be detected without being influenced by the background.

The means for sampling the point of changing the brightness in a system of measuring a length of a pattern using a display microscope image of the invention, is provided with a function capable of designating an area representing a side constituting the pattern and capable of specifying also a range of an edge detection reference line for searching information of an edge point and therefore, the line approximating a corresponding side can properly be sampled.

Means of the invention for sampling the edge point from the image information, can further accurately catch information of the edge of the formed pattern since information of the edge at an actual position of the edge point is not adopted but the edge point is sampled by summing up a plurality of brightness profile signals disposed forwardly and rearwardly in a direction of the edge detection reference line. Further, a direction of searching a point of changing the brightness can be selected relative to the edge detection reference line and therefore, the point of changing the brightness can be searched from a side of a pattern stabilized in view of the brightness and the edge can firmly be detected.

Further, the system of the invention is provided with a function of capable of designating also a direction of changing the brightness and therefore, when the microscope image is monitored and the direction of changing the brightness is specified, the edge can be detected further firmly. Further, the system of the invention is provided with the function of capable of designating at what number of an order the point of changing the brightness is disposed for respective edge detection reference line and therefore, even in the case of a pattern attracting attention which is present at inside of other pattern, an edge of the pattern attracting attention can firmly be detected without erroneous recognition.

What is claimed is:

1. A method of measuring a pattern by using a display microscope image comprising a step of setting an edge detection reference line by designating a range of detecting an edge and a number of edge points to a respective side portion of the pattern in the microscope image, a step of sampling the edge point constituting a point of changing a brightness from information of the image by searching the edge point from a direction orthogonal to the set edge detection reference line, a step of providing a line approximating the respective side portion of the pattern based on position information of a plurality of the edge points and a step of specifying a shape of the pattern by synthesizing information of the approximated line of the respective side portion of the pattern.

2. The method of measuring a pattern by using a display microscope image according to claim 1, wherein a mode of synthesizing the information of the approximated line approximating the respective side portion of the pattern, includes any one of an intersecting point of two pieces of lines a specified point provided from a plurality of intersecting points, an angle made by two pieces of straight lines and a distance between two specified points.

3. The method of measuring a pattern by using a display microscope image according to claim 1, wherein a sample is a pattern of a section, further including a step of previously covering a substance having a brightness different from a brightness of the pattern on an outer face of the pattern by deposition by using an ion beam apparatus.

4. A system of measuring a pattern by using a display microscope image comprising means for setting an edge detection reference line by designating a range of detecting an edge and a number of edge points to a respective side portion of the pattern in the microscope image, means for sampling an edge point constituting a point of changing a brightness by searching the edge point from a direction orthogonal to the set edge detection reference line by information of the image, means for providing a line approximating the respective side portion of the pattern based on position information of a plurality of the edge points and means for measuring a shape of the pattern by synthesizing information of the approximated line approximating the respective side portion of the pattern.

5. The system of measuring a pattern by using a display microscope image according to claim 4, wherein the means for sampling the edge point from the information of the image samples the edge point by summing up a plurality of brightness profile signals disposed forwardly and rearwardly in a direction of the edge detection reference line.

6. The system of measuring a pattern by using a display microscope image according to claim 4, wherein the means for sampling the point of changing the brightness, includes a function capable of designating a direction of searching the brightness profile, or a range of searching the brightness profile, or a direction of changing the brightness of the edge point to be calculated, or at what number of an order of the points of changing the brightness the edge point to be calculated is disposed.

7. The system of measuring a pattern by using a display microscope image according to claim 4, wherein the means for measuring to specify the shape of the pattern by synthesizing the information of the approximated line approximating the respective side portion of the pattern, includes a function by which in order to calculate information of an angle of intersecting two pieces of lines approximating the side portion of the pattern or a position of intersecting the two pieces of lines, the two pieces of lines are specified and thereafter the respective calculation is executed by simply designating the angle or the intersecting point.

* * * * *